(12) United States Patent
Kloker et al.

(10) Patent No.: US 7,735,782 B2
(45) Date of Patent: Jun. 15, 2010

(54) FLOW SURFACE FOR A THREE-DIMENSIONAL BOUNDARY-LAYER FLOW, ESPECIALLY ON A SWEPT WING, A SWEPT TAIL PLANE OR A ROTOR

(75) Inventors: Markus Kloker, Aichtal (DE); Ralf Messing, Eberbach (DE)

(73) Assignee: Universitat Stuttgart, Stuttgart (DE)

( * ) Notice: Subject to any disclaimer, the term of this patent is extended or adjusted under 35 U.S.C. 154(b) by 890 days.

(21) Appl. No.: 11/496,760

(22) Filed: Aug. 1, 2006

(65) Prior Publication Data
US 2007/0029450 A1 Feb. 8, 2007

(30) Foreign Application Priority Data
Aug. 2, 2005 (EP) ................. 05 016 729
Nov. 8, 2005 (EP) ................. 05 024 260

(51) Int. Cl.
*B64C 21/06* (2006.01)
(52) U.S. Cl. .............. 244/209; 244/130; 244/204
(58) Field of Classification Search ............ 244/130, 244/204, 207, 208, 209
See application file for complete search history.

(56) References Cited
U.S. PATENT DOCUMENTS 2,646,945 A * 7/1953 Perry ................. 244/204
2,833,492 A * 5/1958 Fowler ............... 244/209
5,263,667 A * 11/1993 Horstman ............ 244/209
5,316,032 A   5/1994 DeCoux
5,590,854 A * 1/1997 Shatz ................ 244/206
5,899,416 A   5/1999 Meister et al.
6,068,328 A * 5/2000 Gazdzinski ........... 296/181.5
6,332,593 B1  12/2001 Kamiadakis et al.
7,152,829 B2 * 12/2006 Bertolotti ............ 244/209
2005/0178924 A1 8/2005 Bertolotti

* cited by examiner

*Primary Examiner*—Rob Swiatek
(74) *Attorney, Agent, or Firm*—Brinks Hofer Gilson & Lione

(57) ABSTRACT

A flow surface (16), e.g. on a swept aircraft wing, has a three-dimensional boundary-layer flow. The surface is defined by a spanwise direction (z) and a chordwise direction (x). In or on the flow surface excitation locations (22) are arranged, exciting primary disturbances. The disclosure is characterized in that the excitation locations (22) are arranged such that benign steady primary disturbances are excited and maintained on a sufficiently-high amplitude level as longitudinal vortices respectively crossflow vortices, suppressing naturally growing nocent primary disturbances by a nonlinear physical mechanism. The benign primary disturbances preserve a laminar flow, such that unsteady secondary disturbances, which may initiate turbulence and which, otherwise, are excited in streamwise direction by nocent primary vortices, are suppressed or at least stabilized.

16 Claims, 5 Drawing Sheets

FLOW SURFACE FOR A THREE-DIMENSIONAL BOUNDARY-LAYER FLOW, ESPECIALLY ON A SWEPT WING, A SWEPT TAIL PLANE OR A ROTOR

CROSS-REFERENCE TO RELATED APPLICATIONS

This application claims the benefit of European Patent Application No. 05 016 729.5, filed Aug. 2, 2005 and European Patent Application No. 05 024 260.1, filed Nov. 8, 2005. The disclosures of the above applications are incorporated herein by reference.

FIELD

The disclosure relates to a flow surface with three-dimensional boundary-layer flow, especially on a swept wing, a swept tail plane or a rotor, according to the preamble of claim 1.

BACKGROUND

The statements in this section merely provide background information related to the present disclosure and may not constitute prior art.

On every body with a fluid flowing over its surface a thin friction-dominated layer, the so-called boundary-layer, within which the speed of the fluid adapts due to friction to the speed of the body, forms at the body surface. The state of the boundary-layer flow determines the drag, wherein the calm, laminar form causes a significantly smaller drag than the mixing, rough, turbulent form. The turbulent form is caused by the instability of the laminar flow form, which finally becomes turbulent in a transition process by increase of disturbances.

In order to diminish drag and, thus, to increase the efficiency of machines as well as their environmental compatibility, it is attempted to maintain the laminar form as long as possible on the surface of the body, and in the case of a wing, tail plane or rotor, maintaining the laminar form over a profile chord range as large as possible by means of transition delay. A method for achieving this object, is the suction of boundary-layer fluid at the wall surface, which stabilizes the laminar flow.

It was, however, noted that, especially in case of swept aerodynamic surfaces, the boundary-layer suction is not as efficient as desired. This is due to the fact that on such aerodynamic surfaces three-dimensional flow effects occur due to a flow component (cross flow) extending in spanwise direction. This causes an instability of (cross flow) disturbances, leading to an early transition, i.e. an early alteration of the laminar into a turbulent boundary-layer flow.

Three-dimensional laminar boundary-layer flows are highly unstable due to the existing cross flow within the boundary-layer, especially in case of pressure decrease in down-stream direction. Because this instability causes a growth of longitudinal vortex-type (primary-) disturbances and their final disintegration by unsteady secondary disturbances into the turbulent flow form, it has been attempted to weaken the cross flow by suction of boundary-layer fluid at the wall.

For this purpose the wall is provided with perforations, being mostly laser- or electron-ray-blasted micro-hole- or micro-slot arrangements. Suction chambers situated under the surface are connected with vacuum pumps, sucking the fluid from the boundary-layer. Presently, however, no aircraft with boundary-layer suction is in service, but in the past and even in the most recent past repeated flight tests were performed with suction at the vertical fin or at the wings.

For the boundary-layer suction, arrangements of micro-holes with a diameter of typically 50 µm and a chordwise/streamwise and spanwise distance between the holes of typically 500 µm-1000 µm are used, with the object of coming as close as possible to a kind of ideally porous wall. The disadvantage is, however, that each three-dimensional disturbance of the wall flow can excite exactly the aforementioned undesired vortices, even if the perforation distances are selected such that the excitation theoretically occurs in an uncritical streamwise and spanwise wave-number range. The reason is that even smallest non-uniformities in the perforation distribution may again lead to an excitation of unstable disturbances.

A possible solution is suggested in WO 03/089295 A2. Here, the perforation distribution or pattern is designed such that the excitation spectrum being obtained by means of a double-spectral-Fourier-analysis of the two-dimensional (repeating) perforation pattern, has the smallest possible amplitudes at the streamwise and spanwise wave-number values of the unstable steady vortex disturbances. Furthermore, it is proposed to design consecutive hole- or slot groups in such a way that they cancel, as far as possible, steady disturbances arriving from up-stream and being caused by the perforation, or, at least, that they dampen them in such a way that the transition is delayed in chord direction.

WO 03/089295 A2 is based on the principle of the successive local cancellation of undesired excited steady disturbances due to groups of perforations, following a linear method valid for small disturbances. This principle results typically in irregular distances of perforations in spanwise and chordwise direction within a group. In order to be able to achieve the desired minimum excitation or good cancellation, the perforations following each other in chordwise direction must be shifted in spanwise direction at least within the group relative to the streamline or the vortex axis, respectively, of the primary disturbance.

The disadvantage of this proposition is a small robustness of the method, as deviations of the ideal, calculated distribution due to manufacturing tolerances or operationally caused disturbances such as surface dirt or clogged holes lead to a strongly reduced efficiency. Furthermore, only disturbances caused by suction are minimized. There is no influence on other disturbances, e.g. due to undesired surface roughness.

SUMMARY

It is an object of the present disclosure to significantly improve the efficiency of the suction of boundary-layer fluid in three-dimensional boundary-layer flows, as they occur e.g. on (backwardly) swept wings or tail-plane surfaces of aircrafts or on rotors of wind turbines.

This object is achieved with a flow surface as defined in claim 1. Advantageous further embodiments are defined in the sub-claims.

According to the disclosure it was realized that the narrow distance between the excitation locations (seen in spanwise direction) known from the state of the art, which induce a benign primary vortex disturbance, which is not secondarily unstable and suppresses nocent primary vortex disturbances by nonlinear disturbance interaction, delays the transition only over a relatively small distance (seen in chordwise or streamwise direction, respectively). Furthermore, it was realized that a mere and, seen in chordwise direction, repeated periodic arrangement does not solve this problem in a satisfying manner.

The disclosure pursues, instead of an aimed cancellation of undesired primary disturbances, the principle of a continuous excitation (i.e. seen in chordwise or streamwise direction, respectively, over a possibly long distance) of a primary disturbance and its maintenance with a relatively high amplitude (non-linear disturbance with feedback to the basic state). An important aspect of the disclosure is, thus, to permanently excite benign cross-periodic vortex disturbances (primary disturbances) in downstream direction by means of a specific geometric arrangement of the excitation locations in order to sustain them on a usefully high amplitude level. The benign primary crossflow vortices supress naturally growing nocent primary disturbances by a non-linear physical mechanism.

Thus, it is ensured that other nocent primary disturbances, which may occur due to the perforation or other disturbance sources, are suppressed or at least impeded in their unstable development by non-linear disturbance interaction. For this purpose the cross distances (i.e. the distances in spanwise direction) and/or the streamwise distances (i.e. the distances in chordwise or streamwise direction) between the excitation locations are adjusted in such a way that the benign primary vortex disturbance, having preferably approximately ⅔ or less of the spanwise wavelength of the most unstable and dangerous vortex disturbance, is specifically excited.

As, due to the typically altering basic flow, the streamwise wave number of the benign primary disturbances changes in downstream direction, the distances between the excitation locations in this direction are not constant, either. A part of the acting mechanism of the benign primary disturbance ("UFD-vortex"–UFD=Upstream Flow Deformation) is that it generates a deformation of the mean flow (by means of the so-called Reynolds stresses), being somehow not unalike to the deformation by means of suction, but, however, having an improved stabilizing effect.

In direct numerical simulations the positive effect of the permanent UFD-excitation due to the excitation locations arranged now in spanwise as well as chordwise direction could be proved. These simulations are very complex, but under the given boundary conditions very reliable.

By means of the excitation locations arranged according to the disclosure it is achieved that unsteady secondary disturbances, initiating turbulence and being excited in streamwise direction by nocent primary disturbances, are stabilized and, thus, the transition can be delayed over a considerable distance, seen in chordchordwise direction.

By means of the delayed transition a laminar boundary-layer flow can be maintained along a wide chord range, the laminar boundary-layer flow reducing drag. This effect was successfully simulated under aircraft flight-conditions over a practically relevant range of 20 cm in wing chord direction.

For the arrangement of the excitation locations, different patterns are possible, each having its specific advantages with regard to aerodynamic efficiency and manufacturing effort. It is particularly preferred to realize a flow surface with excitation locations being arranged in rows extending in spanwise direction, the distance between the rows increasing in chordwise or streamwise direction. The rows may be arranged in groups, and groups with different geometric parameters (distances and evolution of distances between rows and/or excitation locations) may be arranged in chordwise and/or spanwise direction.

From the point of view of aerodynamic efficiency, it is particularly preferred to realize, seen in chordwise direction, increasing distances between the rows within a group and from a precedent group to a subsequent group, and to realize increasing spanwise distances between excitation locations from one row or group to another.

If suction openings are used as excitation locations, one can furthermore benefit from the known advantages of the known boundary-layer suction. In this case the stabilising effect is larger than in the case of ideal, homogeneous suction with the same suction rate/strength, or for the same effect, the total suction rate/strength can be reduced. A variation of the local suction rate/strength, i.e. of the air volume sucked off per suction opening group, furthermore, permits the adaptation to the actual conditions of the boundary-layer flow.

In order to achieve this positive effect, simple round openings can be used, which can be realised by means of current manufacturing methods. However, slot openings are more suitable for the design. It is favourable, if they are oriented in spanwise direction or approximately perpendicular to the streamlines.

It is also possible, that e.g. only in an upstream leading region, seen in chordwise or streamwise direction, suction openings are used, whereas in a downstream region having e.g. a lower pollution risk, less expensive types of excitation locations can be utilized. The robustness of the method with regard to manufacturing tolerances is significantly higher than with the known cancellation principle based on superposition of anti-phased disturbances.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
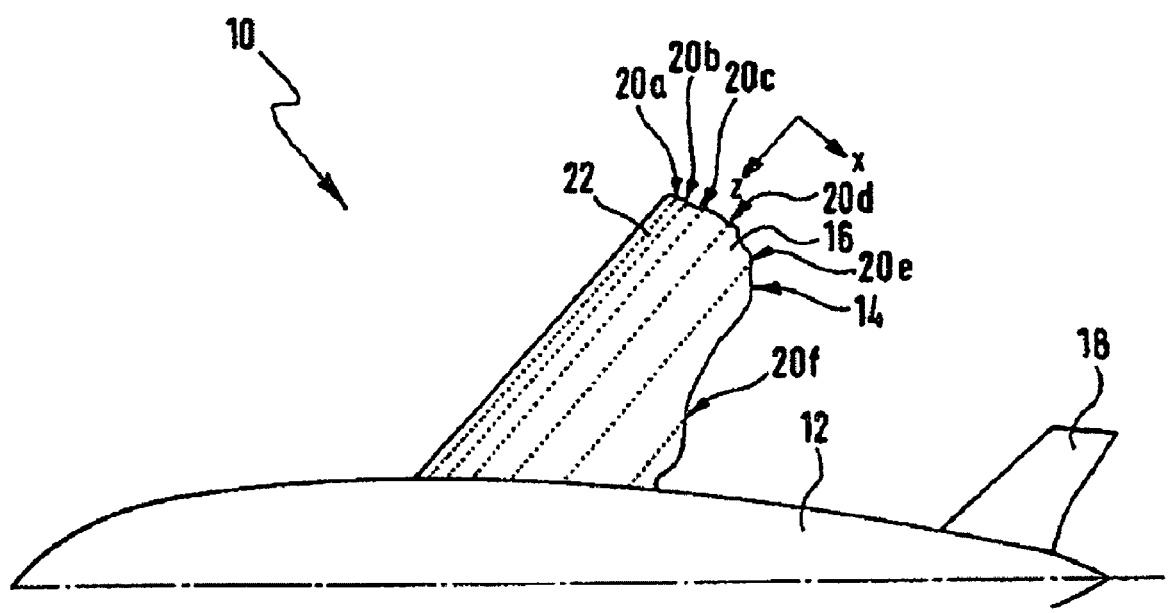
FIG. 1 is a schematic top view representation of an aircraft with a first embodiment of a flow surface.

The following description is merely exemplary in nature and is not intended to limit the present disclosure, application, or uses. It should be understood that throughout the drawings, corresponding reference numerals indicate like or corresponding parts and features.

In FIG. 1 an aircraft is generally designated with reference numeral 10. It comprises a fuselage 12 and a wing 14, constituting a lifting surface. The upper or lower side of the wing forms a flow surface 16. An elevator unit is designated with reference numeral 18. A spanwise direction is designated with z, a chordwise direction of the wing 14 and the flow surface 16 with x.

Figure 2:
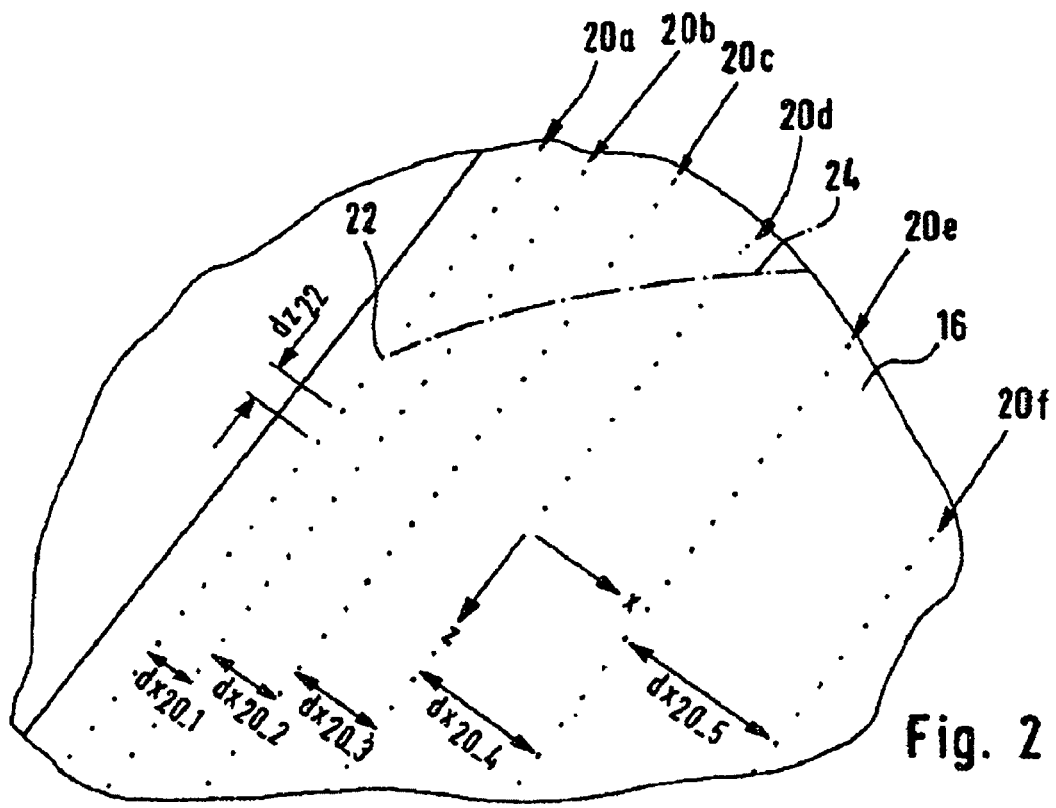
FIG. 2 is an enlarged detail of the flow surface of FIG. 1.

A plurality of rows 20a to 20f of excitation locations 22 is realized in the flow surface 16, the excitation locations being for exciting primary disturbances that spread out in a vortex type manner in flow direction. One of these primary disturbances is shown in FIG. 2 as an example as a dash-dotted-line having the reference numeral 24.

In the present embodiment the excitation locations 22 are realized as suction openings. They are connected to a corresponding pump device (not shown). For reasons of representation only six rows are shown, however, in reality, there are much more of them, i.e. such a number that a reliable excitation of the desired benign primary disturbances 24 over a possibly long chord range of the flow surface 16 is assured.

Figure 4:
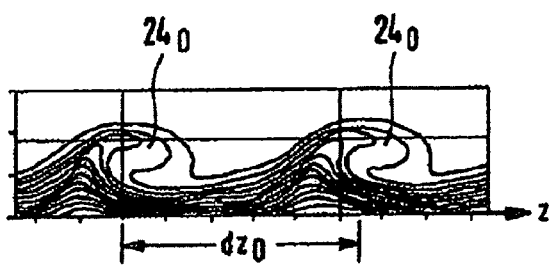
FIG. 4 is a sectional view in a plane situated transversely relative to a main flow direction in order to visualize the shape of natural primary disturbances on a flow surface.
Figure 5:
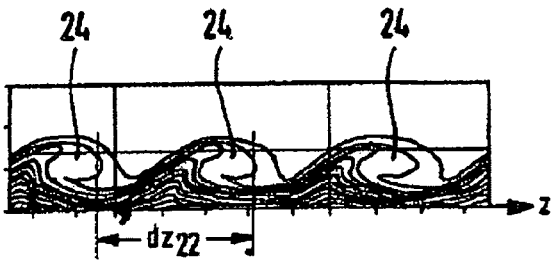
FIG. 5 is a representation similar to FIG. 4 of primary disturbances artificially excited on the flow surface of FIG. 1.

The distances $dz_{22}$ (see also FIG. 5) between excitation locations 22 (and, by consequence, of primary disturbances 24) in spanwise direction z amount to approximately ⅔ of a distance $dz_0$, which "natural", nocent and turbulence initiating primary disturbances $24_0$ (cross flow and longitudinal vortices, as shown in FIG. 4) would have, the primary disturbances $24_0$ being those which would occur, if no excitation locations 22 at all were provided. In the present embodiment, the distances $dz_{22}$ (spanwise direction z) are the same for all rows 20a to 20f.

The chordwise distance $dx_{20\_2}$ between, seen in chordwise direction x, third row 20c and second row 20b is larger than the distance $dx_{20\_1}$ between, seen in chordwise direction, second row 20b and most leading row 20a. Seen in chordwise direction x, this principle continues for the forth, fifth, and sixth rows 20d, 20e and 20f. The distances $dx_{20\_1}$, $dx_{20\_2}$, $dx_{20\_3}$, $dx_{20\_4}$ and $dx_{20\_5}$ between rows 20a to 20f, thus, continuously increase in chordwise direction x.

Figure 3:
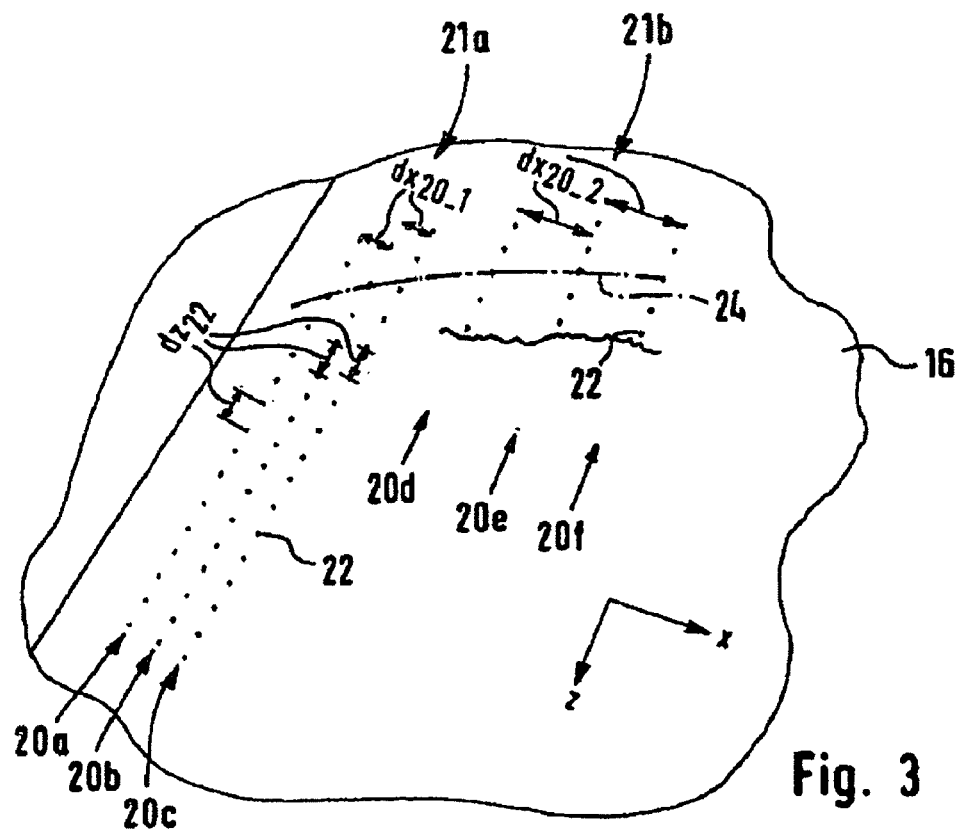
FIG. 3 is a representation similar to FIG. 2 of a modified embodiment.

As can be seen from FIG. 3, it may be advantageous not to increase the distance dx continuously from one row to the next, but in discrete steps. As a consequence, in the wing area shown in FIG. 3 a group 21a of rows 20a-c and a group 21b of rows 20d-f (and so on) is built, having the same spanwise distances $dz_{22}$ between excitation locations 22 of rows 20a-f within all groups 21a and 21b. However, a distance dx between the rows 20a-c, seen in chordwise direction x, remains constant within the first row group 21a with a value $dx_{20\_1}$.

For the next group 21b of rows 20d-f of excitation locations 22, dx skips to $dx_{20\_2} = p \cdot dx_{20\_1}$, with p>1, p=2 being particularly preferred because this value helps to avoid disadvantageous nonlinear generation of nocent vortices. The general expression then is: $dx_{20\_n} = pn-1 \cdot dx_{20\_1}$. It may be noted that in FIG. 3 and subsequent figures the groups 21a and 21b of rows 20a-f of excitation locations 22 are shown in a shortened way for reasons of ease of representation.

As can be seen from FIGS. 2 and 3, the excitation locations 22 are arranged such that the benign primary disturbance 24 is repeatedly excited by excitation locations 22. This benign steady primary disturbance 24 sustaining the laminar flow is maintained as a longitudinal vortex and a cross flow vortex on such a high amplitude level, that unsteady secondary disturbances, which may initiate turbulence and which, otherwise, are amplified by nocent primary disturbances in streamwise direction, are suppressed or at least stabilized.

Figure 6:
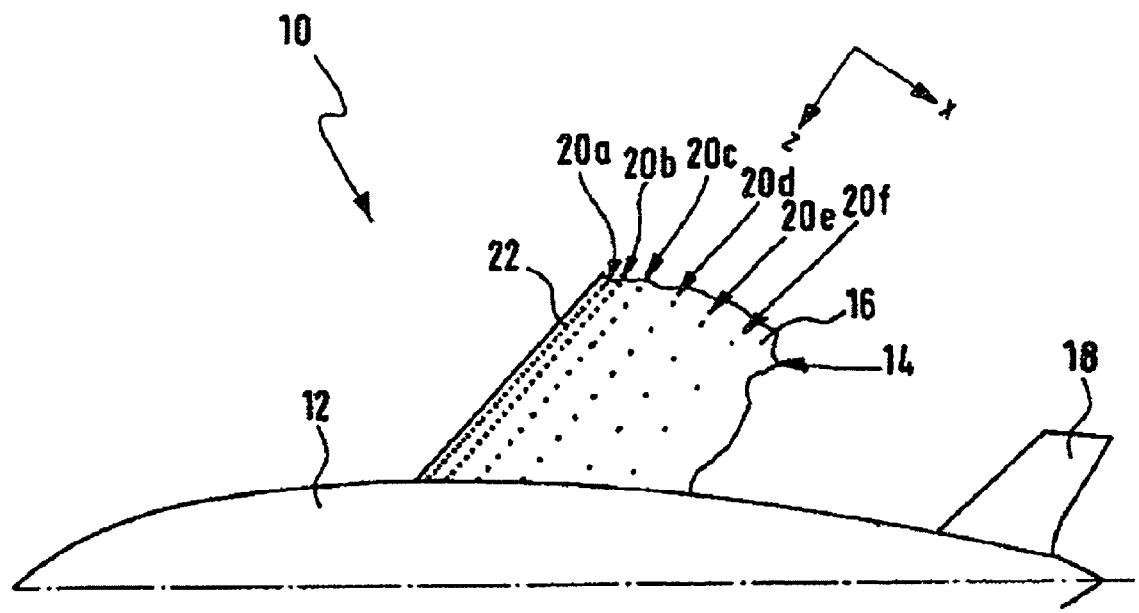
FIG. 6 is a schematic top view representation of an aircraft with a second embodiment of a flow surface.
Figure 7:
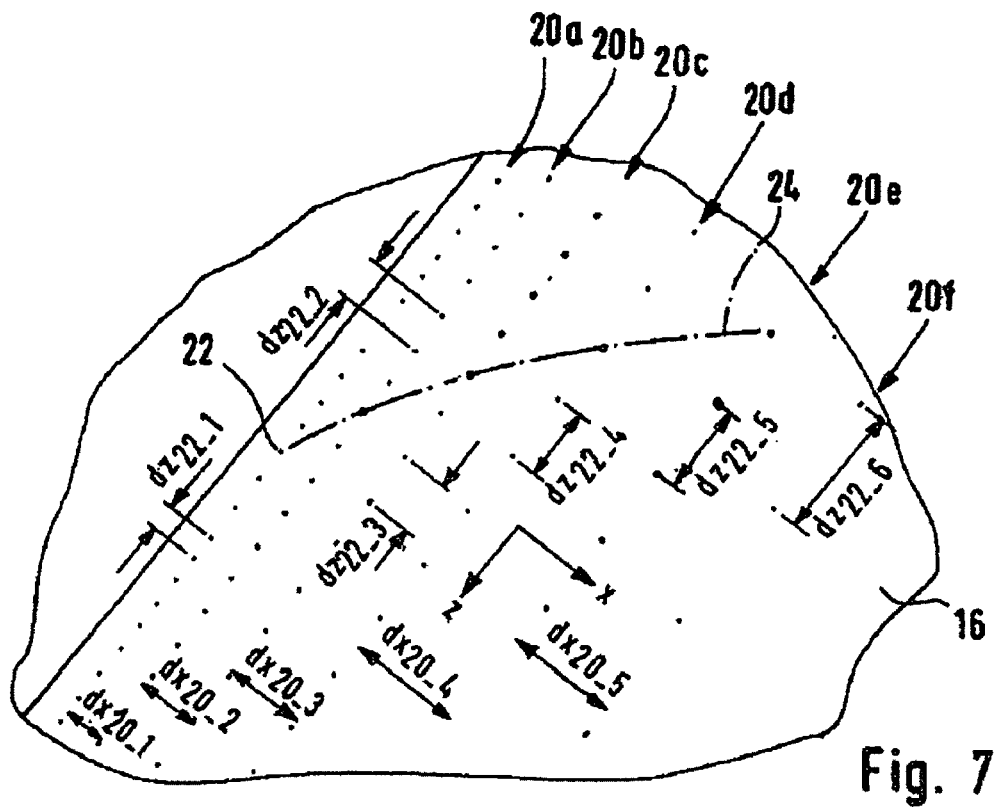
FIG. 7 is an enlarged detail of the flow surface of FIG. 6.

FIGS. 6 and 7 show an aircraft 10 having an alternative embodiment of a flow surface 16. It is noted that such elements and regions having equivalent functions to elements and regions described above are designated with the same reference numerals and are not again described in detail.

In contrast to the embodiment of FIG. 2, the spanwise distances $dz_{22}$ between excitation locations 22 are not the same from one row 20 to another, but increase, seen in chordwise direction x. This means that within the first row 20a the distance is $dz_{22\_1}$, within the next row 20b the distance is $dz_{22\_2}$, and so on. Thus, in FIGS. 6 and 7 the distance $dz_{22\_6}$ between excitation locations 22 within row 20f is the largest, whereas distance $dz_{22\_1}$ between excitation locations 22 within the most leading row 20a is the smallest. Distances $dx_{20\_1}$ to $dx_{20\_5}$ are those of the embodiment of FIG. 2.

Figure 8:
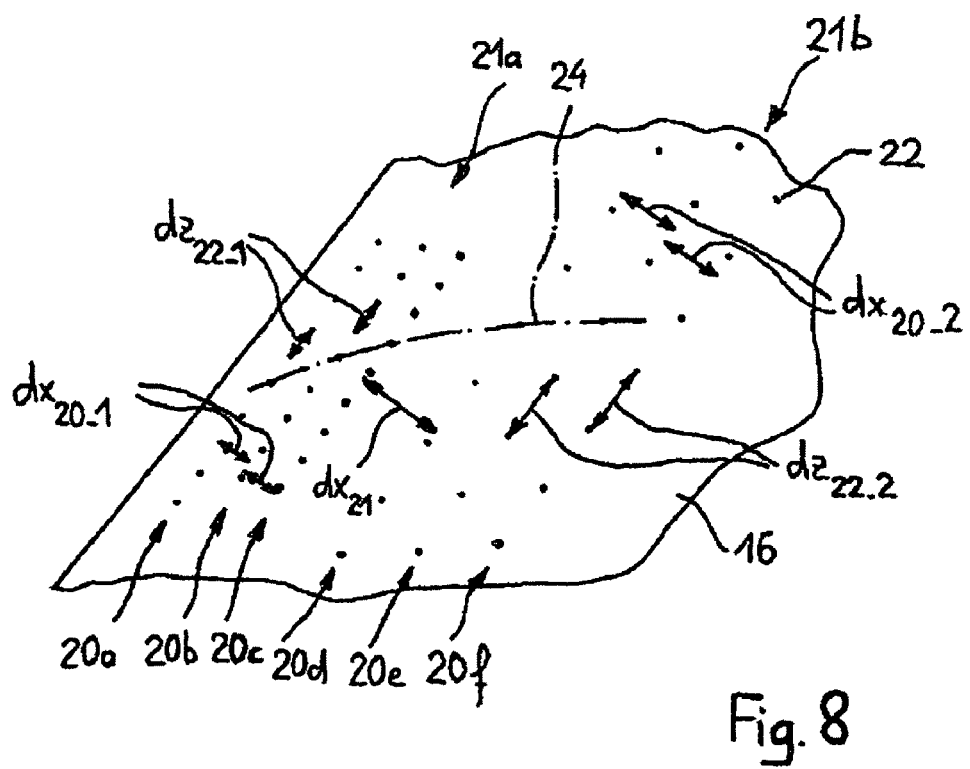
FIG. 8 is a representation similar to FIG. 7 of a fourth embodiment.

FIG. 8 shows an area of another embodiment of a flow surface 16, the general principle of the arrangement of excitation locations 22 being that of FIG. 7, rows 20 however being grouped in groups 21a and 21b. This means that spanwise distance $dz_{22\_1}$ between excitation locations 22 is the same within group 21a, but different to spanwise distance $dz_{22\_2}$ between excitation locations 22 within group 21b.

The chordwise distances $dx_{20\_1}$ and $dx_{20\_2}$ between rows 20a and 20b and between rows 20b and 20c, respectively, are those of the embodiment shown in FIG. 3. The distance $dx_{21}$ is about twice the distance $dx_{20\_1}$. The general expression for such a stepwise variation of the distances is $dx_{20_n n} = pn-1 \cdot dx_{20\_1}$ and $dz_{22\_n} = pn-1 \cdot dz_{22\_1}$. Again, p=2 represents a particularly favourable value.

Figure 9:
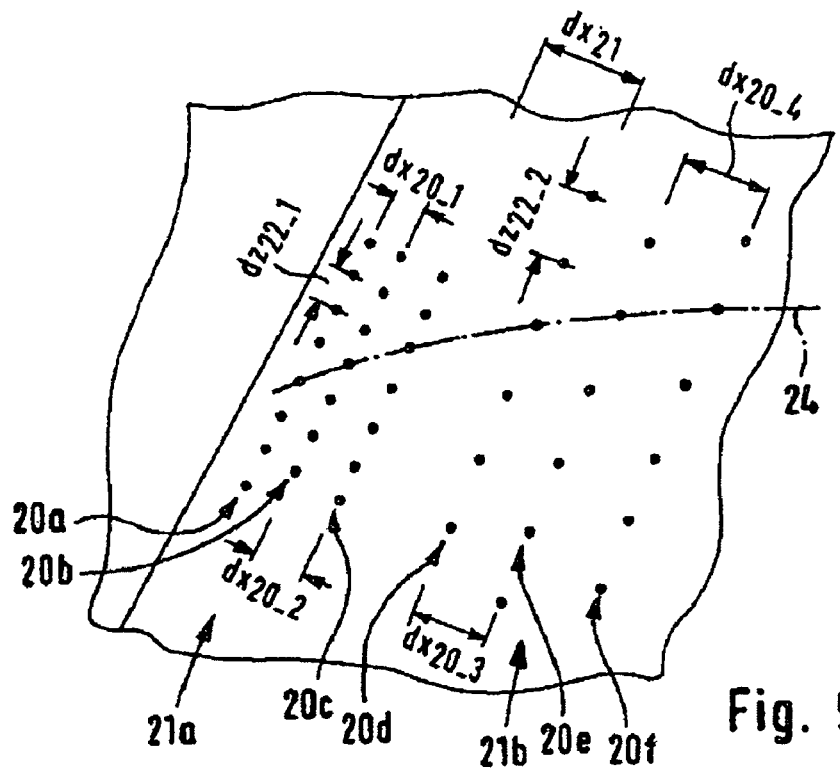
FIG. 9 is a representation similar to FIG. 7 of a fifth embodiment.

FIG. 9 shows a preferred arrangement of a flow surface 16 on a wing with a high aspect ratio, e.g. a long commercial aircraft wing or a long rotor. With such flow surfaces, chordwise variations ("d/dx") of the distances d are considerably higher than their spanwise variations ("d/dz"). In contrast hereto, with flow surfaces with a small aspect ratio, spanwise and chordwise variations may be of the same order of magnitude.

As may be seen from FIG. 9, distance $dx_{20\_1}$ between rows 20a and 20b increases to a value $dx_{20\_2}$ between rows 20b and 20c, rows 20a-c belonging to a row group 21a, with the same spanwise distance $dz_{22\_1}$ between excitation locations 22 of all rows 20a-c within row group 21a. Similarly, distance $dx_{20\_3}$ between rows 20d and 20e increases, seen in chordwise direction x, to a value $dx_{20\_4}$ for the distance between rows 20e and 20f, rows 20d-f being member of a row group 21b, with the same spanwise distance $dz_{22\_2}$ between excitation locations 22 of all rows 20d-f within group 21b, preferably with $dz_{22\_2} = 2 \cdot dz_{22\_1}$.

Distance $dx_{20\_3}$ between the first two rows 20d and 20e of subsequent group 21b is again increased with respect to distance $dx_{20\_2}$ between last two rows 20b and 20c of the preceding group 21a, preferably by a factor 2. The chordwise distance $dx_{21}$ between the last row 20c of preceding group 21a to the first row 20d of subsequent group 21b preferably is twice the distance $dx_{20\_2}$ between the last two rows 20b and 20c of the preceding group 21a.

Figure 10:
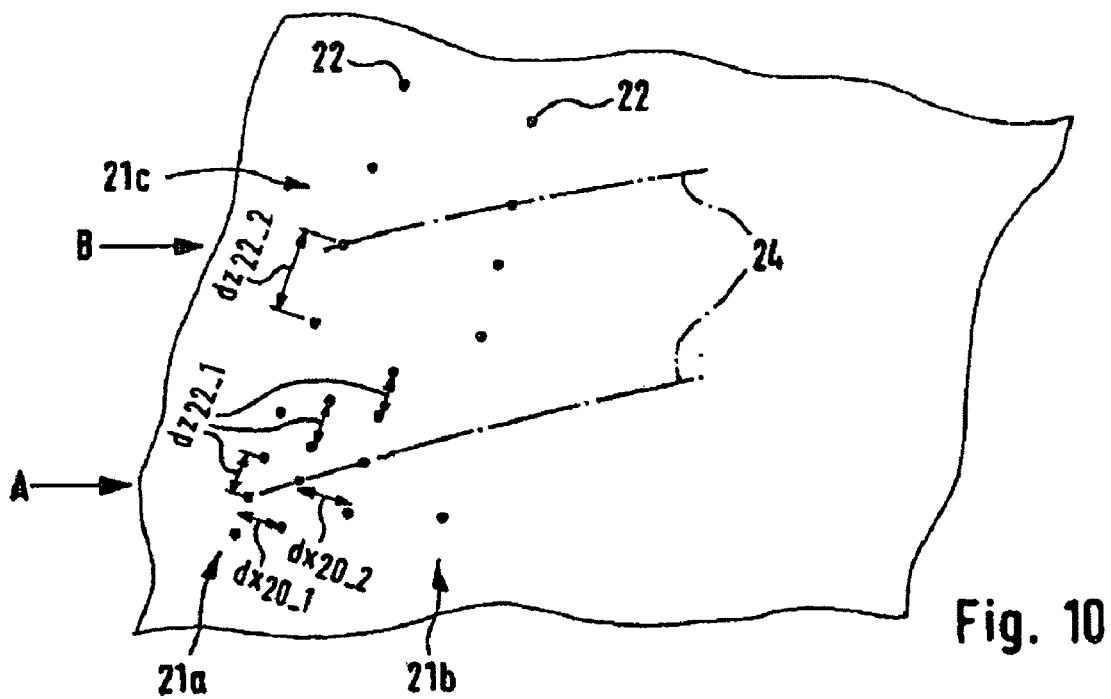
FIG. 10 is a representation similar to FIG. 7 of a sixth embodiment.
Figure 11:
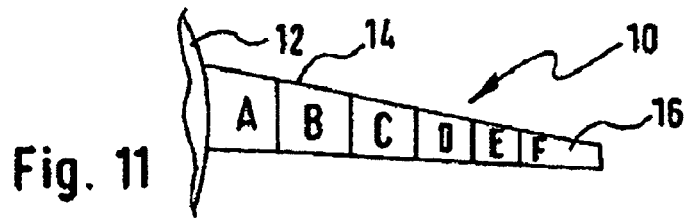
FIG. 11 is a schematic top view representation of an aircraft wing according to the sixth embodiment.

FIGS. 10 and 11 show another embodiment of a flow surface 16 of an aircraft wing 14. As may be seen from this figures, excitation locations 22 are not only grouped in chordwise direction x, but also in spanwise direction z. This means that the gradient of the boundary-layer flow in spanwise direction z is approximated by piecewise constant distance values. As shown in FIG. 11, such flow surface, e.g. an high aspect ratio aircraft wing, is segmented in a plurality of spanwise segments A-F. Within each of the segments A-F the excitation locations 22 can be arranged as shown in one of the preceding FIGS. 3, 8, and 9, the last one being the preferred embodiment.

Another embodiment, yet not shown, may have groups of rows of excitation locations, the groups being defined by equal distances in chordwise direction between the rows within one group, but distances in spanwise direction between excitation locations varying from one row to another within a group.

In the embodiments shown above only chordwise distances dx and/or spanwise distances dz between excitation locations 22 vary. Furthermore possible, yet not shown, is a variation of the suction rate/strength, the geometry of the suction openings and/or the realization of different types of excitation locations, e.g. the realization of suction openings as well as the application of extremely small bumps on the otherwise smooth lift surface.

What is claimed is:

1. A flow surface for a three-dimensional boundary-layer flow, on one of a swept wing, a swept tail plane or a rotor, with a spanwise direction (z) and a chordwise direction (x), with a plurality of excitation locations exciting primary disturbances, characterized by the excitation locations being arranged such that benign steady primary disturbances are continuously excited and maintained on a sufficiently high amplitude level as crossflow vortices, such that temporarily occurring secondary, turbulence initiating unsteady disturbances, which, otherwise, are excited in a streamwise direction by nocent primary disturbances, are suppressed or at least stabilized.

2. The flow surface according to claim 1, wherein the excitation locations are arranged in rows extending in at least a spanwise direction (z), wherein a chordwise distance between one pair of rows is different from a chordwise distance between another pair of rows.

3. The flow surface according to claim 2, wherein a plurality of groups of rows of excitation locations is provided, the excitation locations of one group having the same spanwise distances between each other and different spanwise distances from one group to another group.

4. The flow surface according to claim 3, wherein at least two groups are arranged one behind another in the chordwise direction (x).

5. The flow surface according to claim 4, wherein a distance between a subsequent group and a preceding group is at least approximately twice a distance between a last two rows of the preceding group.

6. The flow surface according to claim 4, wherein a distance between a first two rows of a subsequent group is at least approximately twice a distance between a last two rows of a preceding group.

7. The flow surface according to claim 3, wherein at least two groups are arranged one behind another in the spanwise direction (z).

8. The flow surface according to claim 1, wherein at least some of the excitation locations are realized by suction openings.

9. The flow surface according to claim 8, wherein the excitation locations are arranged in rows and a plurality of groups of rows of excitation locations is provided, wherein a suction rate or strength of at least one row or row group is different from a suction rate or strength of at least another row or row group, and wherein a suction rate or strength of at least one suction opening is different from a suction rate or strength of at least one suction opening of a same row or row group.

10. The flow surface according to claim 8, wherein at least one of a geometry and a size of the suction openings of at least one row or row group is different from at least one of a geometry and a size of suction openings of another row or row group and wherein at least one of the geometry and the size of at least one suction opening is different from at least one of the geometry and the size of another suction opening of the same row or row group.

11. The flow surface according to claim 1, wherein the phrase the excitation locations are arranged in rows and a plurality of groups of rows of excitation locations is provided, wherein a type of excitation location of at least one row or row group is different from a type of excitation location of another row or row group and wherein a type of excitation location of one row or row group is different from another excitation location of a same row or row group.

12. The flow surface according to claim 2, wherein a plurality of groups of rows of excitation locations is provided, the rows within one group having the same chordwise distance between each other and different chordwise distances from one group to another group.

13. The flow surface according to claim 2, wherein the distances between rows increase in the chordwise direction (x).

14. The flow surface according to claim 2, wherein the distances between the excitation locations from one row to another increase in the spanwise direction (z).

15. The flow surface according to claim 1, wherein the excitation locations are arranged in rows extending in at least a spanwise direction (z), wherein a spanwise distance between excitation locations of one row is different from a spanwise distance between excitation locations of another row.

16. The flow surface according to claim 1, wherein a spanwise distance between excitation locations of different rows is the same.

* * * * *